(12) United States Patent
Karweck et al.

(10) Patent No.: US 12,487,589 B2
(45) Date of Patent: Dec. 2, 2025

(54) METHOD FOR MONITORING A FIRST PROCESSOR OF A SENSOR MODULE BY MEANS OF A SECOND PROCESSOR

(71) Applicant: Endress+Hauser SE+Co. KG, Maulburg (DE)

(72) Inventors: Lars Karweck, Binzen (DE); Thomas Zieringer, Schopfheim (DE); Stefan Müller, Emmendingen (DE); Eric Schmitt, Steinsoultz (FR)

(73) Assignee: Endress+Hauser SE+Co. KG, Maulburg (DE)

( * ) Notice: Subject to any disclaimer, the term of this patent is extended or adjusted under 35 U.S.C. 154(b) by 515 days.

(21) Appl. No.: 18/006,439

(22) PCT Filed: Jun. 21, 2021

(86) PCT No.: PCT/EP2021/066749
§ 371 (c)(1),
(2) Date: Jan. 23, 2023

(87) PCT Pub. No.: WO2022/017700
PCT Pub. Date: Jan. 27, 2022

(65) Prior Publication Data
US 2023/0367299 A1    Nov. 16, 2023

(30) Foreign Application Priority Data
Jul. 22, 2020    (DE) ................. 10 2020 119 297.5

(51) Int. Cl.
*G05B 19/418* (2006.01)
(52) U.S. Cl.
CPC ... *G05B 19/4185* (2013.01); *G05B 19/41865* (2013.01)

(58) Field of Classification Search
CPC .......... G05B 19/4185; G05B 19/41865; G05B 2219/25428; G05B 23/0256;
(Continued)

(56) References Cited

U.S. PATENT DOCUMENTS

2006/0236844 A1    10/2006    Sundaram et al.
2010/0192021 A1*    7/2010    Boehl .................. G06F 11/1641
                                                        714/E11.178
(Continued)

FOREIGN PATENT DOCUMENTS

DE    10326665 A1    1/2005
DE    102005037230 A1    2/2007
(Continued)

*Primary Examiner* — Eric J Yoon
(74) *Attorney, Agent, or Firm* — Kelly J. Smith; Endress+Hauser (USA) Holding, Inc.

(57) ABSTRACT

The present disclosure relates to a method for monitoring a first processor using a second processor in a field device, comprising the following method steps: calculating verification data on the basis of specified input data using a test algorithm on an external computing unit storing the input data and the verification data computed by the test algorithm; transferring the specified input data stored in the sensor module and the verification data; transferring the specified input data; executing the test algorithm on the first processor; making the calculated output data available on the second processor; checking the output data with the verification data using the second processor and, if the output data do not correspond to the verification data, establishing a malfunction.

11 Claims, 3 Drawing Sheets

(58) Field of Classification Search
CPC . G05B 19/0428; G06F 11/1637; G06F 11/00; G06F 11/1641; G06F 11/2273
See application file for complete search history.

(56) References Cited

U.S. PATENT DOCUMENTS

2017/0010597 A1* 1/2017 Girardey ................ G01R 35/00
2020/0356085 A1* 11/2020 Wentz .................... H04L 9/0866

FOREIGN PATENT DOCUMENTS

| | | | |
|---|---|---|---|
| DE | 102011007467 A1 | 11/2011 | |
| DE | 102016125240 A1 | 6/2018 | |
| WO | WO2018114193 | * 6/2018 | ........... G05B 19/042 |

* cited by examiner

Fig. 1: Prior art

METHOD FOR MONITORING A FIRST PROCESSOR OF A SENSOR MODULE BY MEANS OF A SECOND PROCESSOR

CROSS-REFERENCE TO RELATED APPLICATIONS

The present application is related to and claims the priority benefit of DPMA Patent Application No. 10 2020 119 297.5, filed on Jul. 22, 2020, and International Patent Application No. PCT/EP2021/066749, filed on Jun. 21, 2021, the entire contents of which are incorporated herein by reference.

TECHNICAL FIELD

The invention relates to a method for monitoring a first digital processor integrated into a sensor module of a field device of automation technology and having a first set of machine commands on which, in order to calculate a measured value on the basis of supplied raw measured values, an algorithm is executed by means of a second digital processor integrated into a main electronics module of the field device.

BACKGROUND

Field devices for recording and/or modifying process variables are frequently used in process automation technology, as well as in manufacturing automation technology. Measuring devices or sensors, such as level measuring devices, flow meters, pressure and temperature measuring devices, pH-redox potential meters, conductivity meters, etc., are used for recording the respective process variables such as fill-level, flow, pressure, temperature, pH level, and conductivity. To influence process variables, actuators, such as, for example, valves or pumps, are used, via which the flow rate of a fluid in a pipeline section or a fill-level in a container can be altered by means of actuators.

The company group Endress+Hauser produces and distributes a large variety of such field devices.

Such field devices usually have an electronic sensor circuit, which are known per se. The electronic sensor circuit is used in the field devices in order to be able to further process raw measured values. For example, a process variable in the form of raw measured values is recorded by means of an analog electrical transducer element, and the analog raw measured values are digitized by means of an analog-to-digital converter in order to subsequently be able to further process the digitized raw measured values by means of a digital processor with the aid of an algorithm. In the process, a series of operation can be carried out with the raw measured values by means of the digital processor. For example, a temperature compensation of the raw measured values can be carried out, in order to obtain a temperature-compensated digital output signal in the form of measured values.

In order to be able to use such field devices in safety-critical applications, stricter requirements are imposed on the functionality of the field device, such that an error of the field device does not remain unnoticed. These requirements include, for example, the certification of field devices according to the so-called SIL standard of the international standard IEC 61508 for functional safety.

In order to achieve SIL 2, diagnostic measures in the form of redundant hardware and/or software are generally used, for the highest possible fault detection and safe failure fraction (SFF). For example, a further digital processor is located next to the digital processor of the sensor electronics for the further processing of the digitized raw measured values in the field device. The algorithm also runs on this further processor, on the basis of which algorithm the raw measured values are processed further. The same input data is supplied to the further processor as to the processor of the sensor electronics, and therefore the output data of the further processor should correspond to the output data of the processor of the sensor electronics. In this way, a simple comparison of the two sets of output data can be carried out, and the processor of the sensor electronics can therefore be monitored.

A disadvantage of this is that the algorithm must be written into the further processor each time the field device is started up. This must be done, in particular, when the algorithm on the processor of the sensor electronics changes.

SUMMARY

The object of the invention is therefore to propose a diagnostic measure that is necessary for achieving SIL2 and that can be realized in a simple manner in a field device of automation technology.

The object is achieved according to the present disclosure by the method according to the present disclosure. The method according to the invention for monitoring a first digital processor integrated into a sensor module of a field device of automation technology and having a first set of machine commands on which, in order to calculate a measured value on the basis of supplied raw measured values, an algorithm is executed by means of a second digital processor integrated into a main electronics module of the field device, comprises the following method steps:

a) calculating verification data on the basis of specified input data by means of a test algorithm (OPCT) on an external computing unit that is independent of the field device, wherein the test algorithm (OPCT) is divided into at least one initial section (OPCT1) and an end section (OPCT2), wherein the initial section (OPCT1) and the end section (OPTC2) comprise at least one, and preferably all, opcodes of the first set of machine commands used while executing the algorithm (Comp) on the first processor;

b) storing the input data specified for calculating the verification data and the verification data computed by means of the test algorithm in the sensor module of the field device;

c) transmitting the specified input data stored in the sensor module and the verification data to the main electronics module;

d) transmitting the specified input data from the main electronics module to the sensor module during measuring operation of the field device;

e) executing the test algorithm on the first digital processor of the sensor module in such a way that output data are calculated on the basis of the specified input data transmitted from the main electronics module, and the algorithm (Comp) between the initial section (OPCT1) and the end section (OPCT2) is executed such that, after the test algorithm has been executed, it can be checked on the basis of the verification data whether the algorithm has been run through completely;

f) making the output data calculated by means of the first digital processor available in the main electronics module;

g) checking the output data with the verification data, made available by the sensor module, by means of the second digital processor of the main electronics module and, if the output data do not correspond to the verification data, determining a malfunction.

According to the invention, verification data are calculated by means of a test algorithm on an external computing unit—for example, a manufacturing computer. This can be done, for example, by means of a numerical calculation tool. In order to obtain the verification data, the test algorithm is executed using specific input data. Subsequently, both the input data and the verification data, which have been calculated using the input data, are stored on a memory element—for example, in the form of a look-up table. This takes place, in particular, during manufacture of the sensor module by the manufacturer of the sensor module. By calculating and storing the input and verification data in advance, i.e., before the actual use of the field device during measuring operation, the parallel execution of the test algorithm on the second processor, which monitors the first processor, can then be dispensed with during the subsequent execution of the test algorithm during actual measuring operation. Rather, the test algorithm need only be executed on the first processor to be monitored during measuring operation and then, on the basis of the input and verification data stored in the sensor module, it is possible to check whether the output data calculated by executing the test algorithm on the first processor correspond to the verification data previously transmitted from the sensor module to the main electronics module, wherein a malfunction is determined in the event of a deviation.

According to another advantageous embodiment of the method according to the invention, the method steps d) through g) are carried out cyclically during measuring operation of the field device.

According to another advantageous embodiment of the method according to the invention, the method step c) is carried out during a system start-up of the field device.

According to another advantageous embodiment of the method according to the invention, the method step b) is carried out during manufacture of the sensor module, and in particular by the field device manufacturer.

According to another advantageous embodiment of the method according to the invention, during actual measuring operation of the field device, raw measured values are cyclically fed to the first digital processor, and the raw measured values during actual measuring operation are cyclically processed further by the first processor using the algorithm (Comp).

According to another advantageous embodiment of the method according to the invention, during actual measuring operation of the field device, the raw measured values are fed to the first digital processor and are processed further using the algorithm (Comp) at a higher clock rate than that at which the test algorithm is executed with the specified input data.

According to another advantageous embodiment of the method according to the invention, after the method steps e) through g) are carried out, when carried out again, they are carried out with other input data which were previously transmitted from the sensor module to the main electronics module.

According to another advantageous embodiment of the method according to the invention, the algorithm is divided into several sections C1 . . . Cn, and, when executed, the several sections of the algorithm between the initial section and the end section are executed. In particular, according to the embodiment, the test algorithm may also be divided into several sections S1 . . . Sn, and, when executed, the sections of the algorithm C1 . . . Cn and of the test algorithm S1 . . . Sn are executed in an alternating manner.

According to another advantageous embodiment of the method according to the invention, the verification data are calculated on a manufacturing computer during manufacture of the sensor module by the manufacturer of the sensor module. In particular, the verification data can be calculated on the manufacturing computer by means of a numerical calculation tool.

BRIEF DESCRIPTION OF THE DRAWINGS

The invention is explained in more detail on the basis of the following drawings. The following are shown.

DETAILED DESCRIPTION

Figure 1:
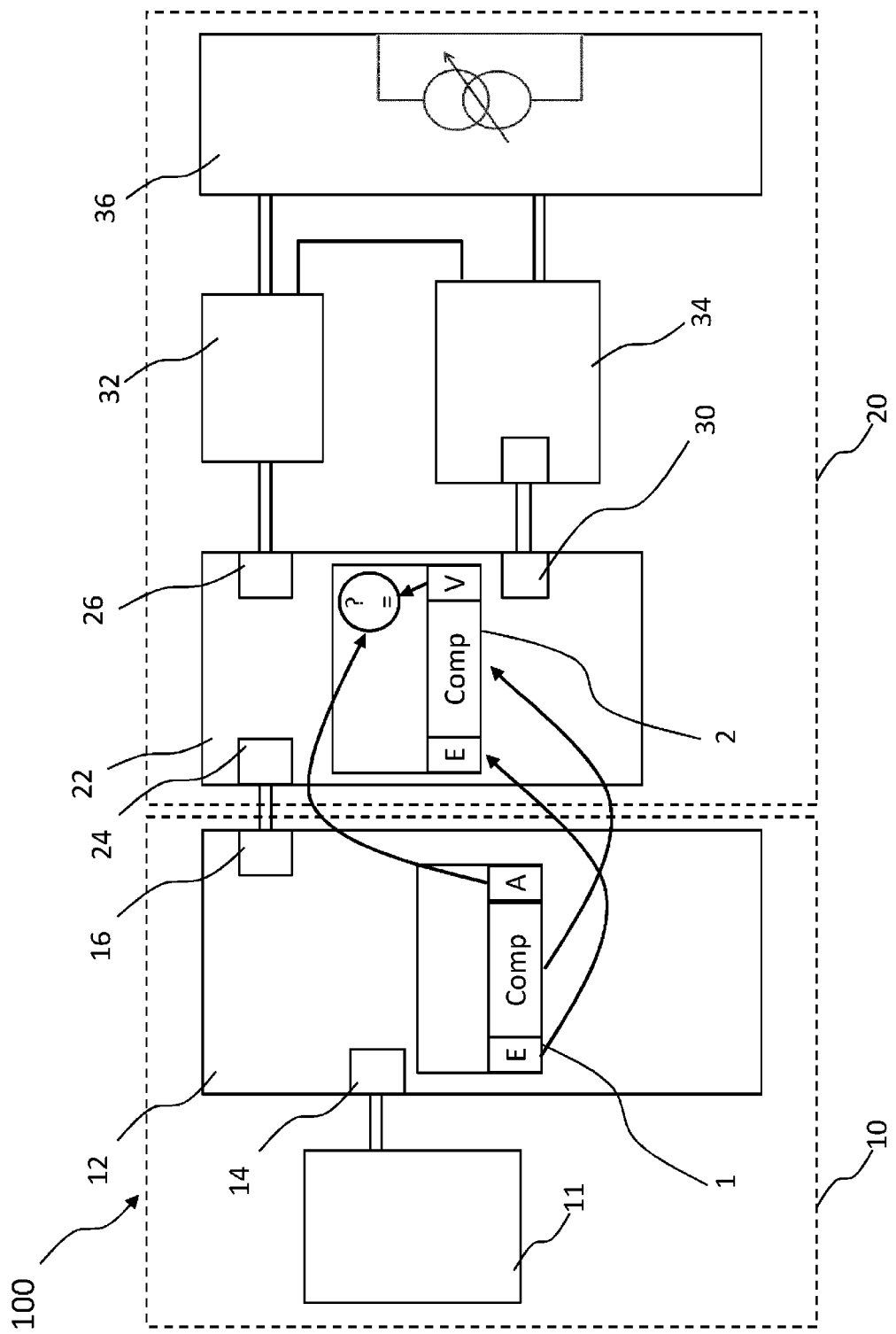
FIG. 1 shows a schematic block diagram of a field device having an electronic field device circuit known from the prior art.

The field device 100 shown in FIG. 1 comprises an electronic field device circuit, which is composed of a sensor module 10 and a main electronics module 20, and a complementarily designed, digital communications interface 16, 24. The sensor module and the main electronics 20 are designed in such a way that various sensor modules can be connected to the main electronics 20 or are compatible with one another, depending upon the physical variable to be recorded. In this case, the main electronics 20 are always of the same design, and only the sensor module has a different design, depending upon which physical variable is to be recorded, i.e., for example, whether a pressure or a fill-level variable is to be recorded.

Figure 3:
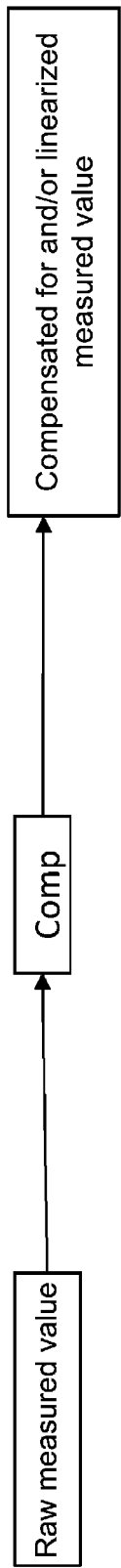
FIG. 3 shows a schematic representation of the algorithm which, during actual measuring operation, runs on the first processor of the sensor module—for example, for temperature compensation.

The sensor module 10 comprises a transducer element 11, e.g., a capacitive or resistive pressure transducer element, and sensor electronics 12, wherein raw measured values in the form of a primary signal are fed from the transducer element to an analog sensor input 14 of the sensor electronics 12. These raw measured values are digitized by the sensor electronics 12 and subsequently processed or processed further into corresponding measured values by a first digital processor 1, e.g., a digital signal processor (DSP), by means of an algorithm Comp running on said processor 1. Typically, a temperature compensation of the raw measured value takes place by means of the algorithm Comp running on the digital signal processor 1. FIG. 3 illustrates the running of the algorithm on the first processor on the basis of which the raw measured values are processed further to form a compensated for measured value. The raw measured value can be processed, for example, at an interval of from a few milliseconds (ms) up to a few tens of milliseconds by the first processor. The processed measured value is made available to the main electronics module 20 via a first digital communications interface 16. In order to achieve increased flexibility during manufacture of the field device, the sensor module is designed as an exchangeable module. As a result, different sensor modules can be combined with the main electronics module during manufacture in order to design the field device specifically for a measurement task.

In the embodiment shown, the main electronics module 20 comprises a logic unit, a current regulator 32, a HART modem 34, and a communications interface—for example, a controlled current source 36.

The logic unit 22 comprises a second digital processor, e.g., a microprocessor, a second digital communications interface 24, which communicates with the first digital communications interface 16. The digital measured value is transmitted via this digital communications interface, for example, during normal measuring operation, and the logic unit 22 prompts the current regulator 32 via a third digital communications interface 26 to regulate the controlled current source 36 in such a way that it provides an analog current signal which represents the digital measured value or a measured variable derived therefrom.

Furthermore, the logic unit 22 comprises a fourth digital communications interface 30, via which the HART modem 34 is activated in order to modulate digital information, e.g., status information, onto the analog current signal.

The electronic circuits known from the prior art are configured in such a way that the algorithm Comp is executed on the first processor 1 with at least partial use of the machine commands available for the first processor 1.

In order to meet the SIL measures mentioned at the outset, the algorithm Comp is also installed on the second processor 2. The installation takes place according to the prior art when the field device is started up or in an initialization phase of the field device before it switches to actual measuring operation. In the process, the algorithm is transmitted via the internal communications interface 16 and 24 from the sensor module to the main electronics module. Both the algorithm on the first and on the second processor are then executed in parallel at runtime, i.e., during actual measuring operation of the field device.

The algorithm calculates the output-side verification data V on the second processor using the machine commands of the second processor 2. For this purpose, the input data E are transmitted from the sensor module to the main module—for example, via the communications interface 16 and 24. The verification data V obtained by the second processor 2 are subsequently compared, according to the prior art, with the output data A obtained by the first processor 1 in order to allow for a check of the first processor 1. In the event that the two results do not match, an error is determined and signaled. The redundant execution of the algorithm both on the first and on the second processor achieves SIL Level 2.

Figure 2:
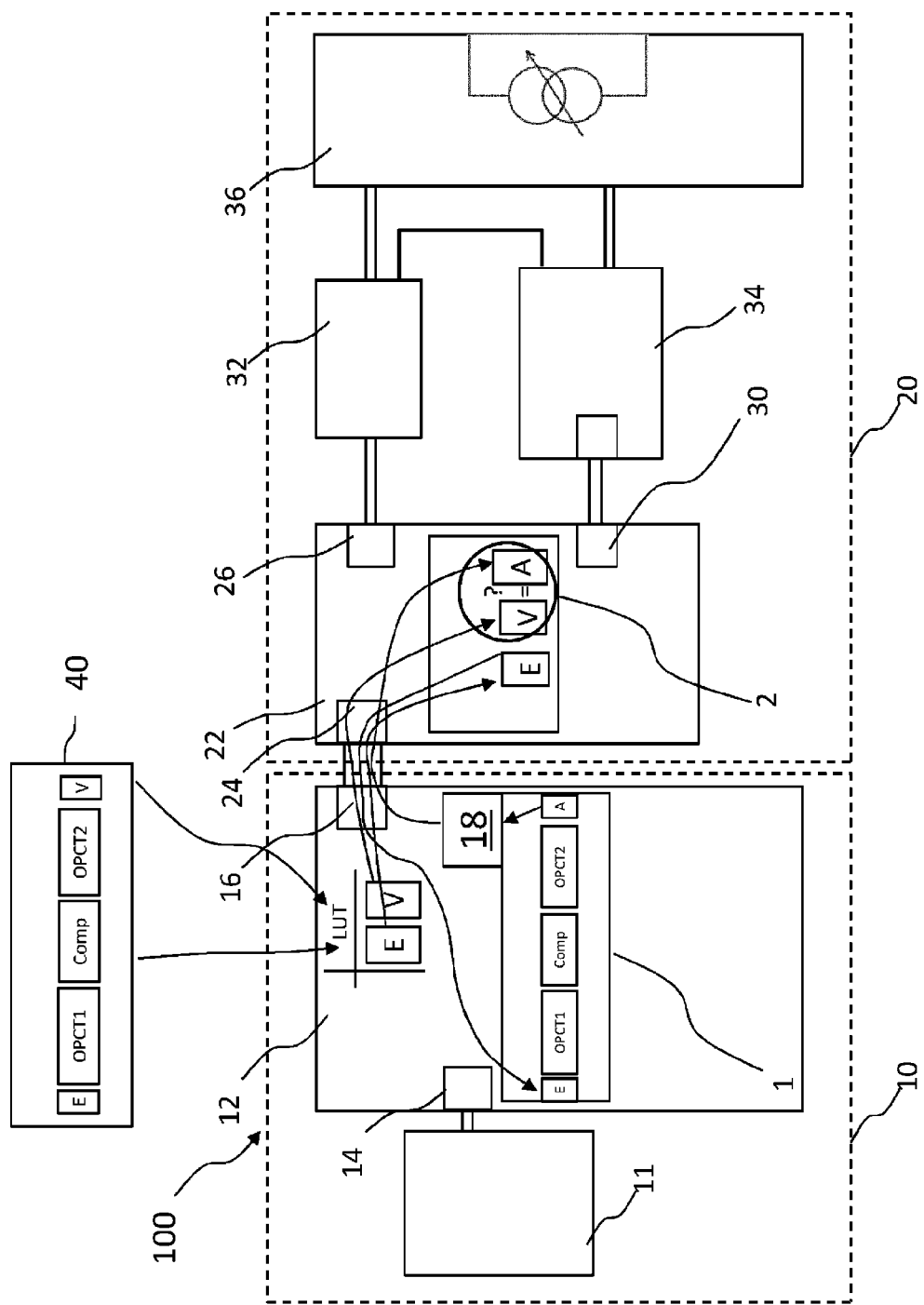
FIG. 2 shows a schematic block diagram of an embodiment of a field device which comprises an electronic field device circuit configured with the method according to the present disclosure.

FIG. 2 shows a schematic block diagram of an embodiment of a field device according to the invention. The field device shown here has the same components as the field device shown in FIG. 1. Identical components are designated by the same reference signs.

In the embodiment shown in FIG. 2, the sensor module of the field device additionally has a non-volatile memory in which a table (look-up table) is stored. Input data and verification data are saved or stored in the table. According to the invention, the input data and the verification data are calculated externally, i.e., outside the field device—for example, during manufacture by means of a corresponding piece of software on a computing unit. A numerical calculation tool or software such as MATLAB or similar software, for example, can be used for the calculation. In this case, verification data associated with specified input data are calculated. Subsequently, the input data and the verification data are stored in the memory of the sensor module during manufacture of the sensor module, such that said data are available later during actual measuring operation of the field device.

Therefore, the entire algorithm no longer has to be transmitted via the internal communications interface 16 and 24 in order to fulfill the SIL measures mentioned at the outset, but, rather, only the input and verification data stored in the memory. The transmission of the input and verification data from the sensor module to the main electronics module preferably takes place during a system start-up of the field device before the field device commences actual measuring operation.

The execution of the test algorithm is initiated by the second processor of the main electronics module. This can take place, for example, cyclically during actual measuring operation. This means that the second processor during actual measuring operation starts executing the test algorithm on the first processor, during which the algorithm is executed on the first processor of the sensor module in order to compensate for the raw measured value. For this purpose, the second processor first transmits the input data, which have been made available in the main electronics module during system start-up, to the sensor module.

In the next step, initiated by the second processor, the test algorithm is executed on the first processor. For this purpose, output data are calculated by means of the previously transmitted input data. The test algorithm is designed in such a way that all machine commands or all opcodes required for executing the algorithm Comp are used at least once by the test algorithm. The test algorithm is a so-called opcode test, during which at least parts of the opcodes of the first processor are tested.

Figure 4:
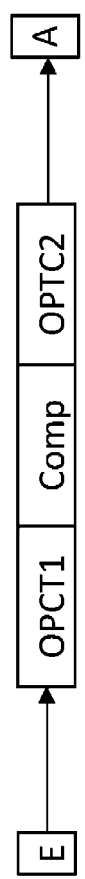
FIG. 4 shows a schematic representation of the test algorithm which, according to the present disclosure, runs on the first processor of the sensor module for monitoring the first processor.

As shown by way of example in FIG. 4, the test algorithm can be divided at least into an initial and an end section, OPCT1 and OPCT2. The first processor 1 is further configured such that at least part of the algorithm Comp, and preferably the entire algorithm Comp between the initial section OPCT1 and the end section OPCT2, is executed.

Figure 5:
FIG. 5 shows a schematic representation of an advantageous variant of the test algorithm which, according to the present disclosure, runs on the first processor of the sensor module for monitoring the first processor.

Alternatively, the test algorithm opcode can be divided into a plurality of sections C1 . . . Cn, and the algorithm Comp can be divided into a plurality of sections S1 . . . Sn, and the first processor can be configured such that, during execution, part of the test algorithm and then part of the actual algorithm are executed alternately until all parts of the algorithm Comp and all parts of the test algorithm have been run through. FIG. 5 illustrates such a variant, in which output data are calculated by the first processor 1 by means of the previously transmitted input data.

In the next step, the output data calculated by the first processor 1 are made available in the main electronics module, such that the second processor has access to said data. This can be done, for example, by transmitting the output data via the internal communications interface 16 and 24 from the first to the second processor. For this purpose, the output data can first be kept in an internal register 18 of the first processor 1, such that the second processor can access said data via the communications interface 16 and 24.

Subsequently, the second processor checks whether the available output data correspond to the verification data transmitted from the sensor module to the main electronics module, preferably during the system start-up of the field device. In the event that a deviation of the data is established, an error message is, furthermore, output by the second processor.

LIST OF REFERENCE SIGNS

100 Field device
1 First digital processor
2 Second digital processor
10 Sensor module
11 Transducer element
12 Sensor electronics
14 Communications interface
16 Communications interface
18 Internal register of the first processor
20 Main electronics module
22 Logic unit
24 Communications interface
26 Communications interface
30 Communications interface
32 Current regulator
34 HART modem
36 Controlled power source
E Input data
A Output data
V Verification data
OPCT1 Initial section of the test algorithm
OPCT2 End section of the test algorithm
C1 . . . Cn Individual sections of the test algorithm
Comp Algorithm for further processing the raw measured value, especially for temperature compensation and/or linearization

The invention claimed is:

1. A method for monitoring a first digital processor integrated into a sensor module of a field device of automation technology and having a first set of machine commands on which, in order to calculate a measured value on the basis of supplied raw measured values, an algorithm is executed using a second digital processor integrated into a main electronics module of the field device, said method comprising the following method steps:
   calculating verification data on the basis of specified input data using a test algorithm on an external computing unit that is independent of the field device, wherein the test algorithm is divided into at least one initial section and an end section, wherein the at least one initial section and the end section comprise at least one opcode of the first set of machine commands used while executing the algorithm on the first processor;
   storing the specified input data specified for calculating the verification data and the verification data calculated using the test algorithm in the sensor module of the field device;
   transmitting the specified input data stored in the sensor module and the verification data to the main electronics module;
   transmitting the specified input data from the main electronics module to the sensor module during measuring operation of the field device;
   executing the test algorithm on the first digital processor of the sensor module in such a way that output data are calculated on the basis of the specified input data transmitted from the main electronics module, wherein the algorithm between the initial section and the end section is executed such that, after the test algorithm has been executed, the algorithm can be checked on the basis of the verification data whether the algorithm has been run through completely;
   making the output data calculated using the first digital processor available in the main electronics module;
   checking, using the second digital processor of the main electronics module, the output data with the verification data that is made available by the sensor module and, if the output data does not correspond to the verification data, determining a malfunction.

2. The method according to claim 1, wherein the method steps of transmitting the specified input data from the main electronics module to the sensor module during measuring operation of the field device, the executing step, the making step, and the checking step are carried out cyclically during measuring operation of the field device.

3. The method according to claim 1, wherein the method step of transmitting the specified input data stored in the sensor module and the verification data to the main electronics module is carried out during a system start-up of the field device.

4. The method according to claim 1, wherein the method step of storing the input data specified for calculating the verification data and the verification data computed using the test algorithm in the sensor module of the field device is carried out during manufacture of the sensor module.

5. The method according to claim 1, wherein, during actual measuring operation of the field device, raw measured values are cyclically fed to the first digital processor, and the raw measured values during actual measuring operation are cyclically processed further by the first processor using the algorithm.

6. The method according to claim 1, wherein, during actual measuring operation of the field device, the raw measured values are fed to the first digital processor and are processed further using the algorithm at a higher clock rate than that at which the test algorithm is executed with the specified input data.

7. The method according to claim 1, wherein, after the method steps of executing, making and checking are carried out, when carried out again, they are carried out with other input data which were previously transmitted from the sensor module to the main electronics module.

8. The method according to claim 1, wherein the algorithm is divided into several sections, and, when executed, the several sections of the algorithm between the initial section and the end section are executed.

9. The method according to claim 8, wherein the test algorithm is also divided into several sections, and, when executed, the sections of the algorithm and of the test algorithm are executed in an alternating manner.

10. The method according to claim 1, wherein the verification data are calculated on a manufacturing computer during manufacture of the sensor module by the manufacturer of the sensor module.

11. The method according to claim 10, wherein the verification data are calculated on the manufacturing computer using a numerical calculation tool.

* * * * *